No. 762,882. PATENTED JUNE 21, 1904.
J. P. CLARE.
SECONDARY BATTERY.
APPLICATION FILED OCT. 31, 1902.
NO MODEL.
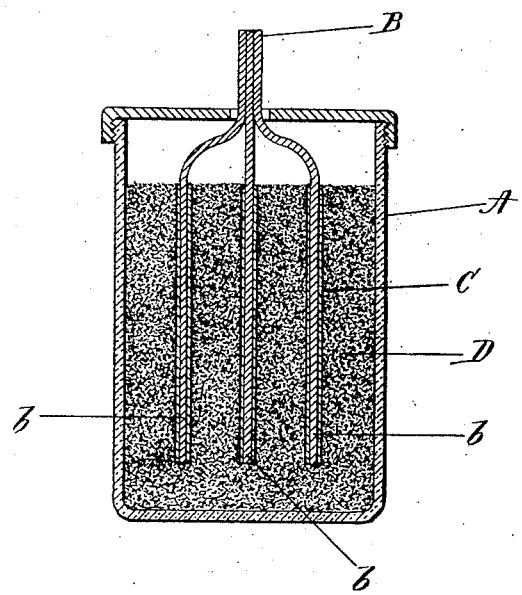
WITNESSES:
INVENTOR:

No. 762,882. Patented June 21, 1904.

UNITED STATES PATENT OFFICE.

JAMES P. CLARE, OF QUINCY, MASSACHUSETTS.

SECONDARY BATTERY.

SPECIFICATION forming part of Letters Patent No. 762,882, dated June 21, 1904.

Application filed October 31, 1902. Serial No. 129,517. (No model.)

*To all whom it may concern:*

Be it known that I, JAMES P. CLARE, a citizen of the United States, and a resident of Quincy, in the county of Norfolk and State of Massachusetts, have invented a new and useful Improvement in Secondary Batteries, of which the following is a full, clear, and exact description, reference being had to the accompanying drawing, forming a part of this specification, in explaining its nature.

The invention relates to a secondary or storage battery; and it consists in means whereby the inconveniences of the ordinary free exciting fluid in the battery-cell are avoided, the purpose of the invention being to provide what may be termed a "dry" or apparently fluidless secondary or storage battery.

In practicing the invention any form of electrode and any kind of active material located in any desired way in a suitable holding or containing vessel or cell may be employed, and there is used, in conjunction with said electrode and active material, as a substitute for the exciting fluid or liquor (sulfuric acid) which is generally employed, a body or mass of lightly-compressed cocoanut fiber which has previously been saturated with sulfuric acid, the whole forming an absorbent cellular substance which is not attacked by the action of the acid with which it is saturated, but which serves to uniformly hold it in its cells and pores and among its fibers and throughout its mass and without reducing the acid to the form of a continuous liquid body in the cell or jar. The mass of saturated fiber being more or less aerated throughout, is held in contact with the active material borne by the electrode, and thus furnishes a structure which is apparently fluidless and which will permit the vessel or cell to be used in any position.

I will now describe the invention more in detail in conjunction with the drawing forming a part of this specification.

Referring to the drawing, A represents a vessel of any desired form and capacity adapted to hold the electrode B, active material C, and the so-called "dry" exciter D. The electrode may consist of any number of lead or other suitable plates $b$, and they may be coated or covered in any desired way with the active material C.

The dry exciter D of the impregnated and saturated cocoanut fiber is contained in the vessel and so as to bear against the active material of the electrodes, wherever that may be, and has sufficient resiliency when compressed in the vessel to continuously bear against said active material and form practically a continuous contact therewith. Where the electrode consists of three plates, as represented in the drawing, the dry exciter will generally be contained in the vessel between the plates, as well as between the outer plates and the vessel. The dry exciter is made of the fiber of the husk or outer covering of the cocoanut. This fiber, I have ascertained, has the property of resisting the destructive action of sulfuric acid and when prepared and treated as hereinafter described will absorb and hold sulfuric acid of the desired strength and not be broken down or formed into a paste-like mass by it. In other words, its integrity is maintained, so that it serves to continuously hold the acid and prevent it from running together in the vessel and forming a continuous body of the liquor either in the form of a paste or in any other form. The fiber is prepared for use by being reduced to a granular form, preferably by grinding and by being washed in fresh cold water and then dried. It is then soaked in sulfuric acid of the desired strength for battery-work as long as may be desired and at least for five or six hours, and it absorbs and holds the acid much like a sponge absorbs and holds water; but its cellular structure apparently is not destroyed by it. It is then applied to the electrodes and active material with a mild pressure, but only sufficient to pack it against the exposed surfaces of the active material held upon the plates in the vessel of the battery, and by capillary or other attraction the surface of the active material exposed to the dry exciter is maintained sufficiently moist to insure the working of the battery for relatively long periods of time, while the battery is devoid of a fluid in the form of an independent or continuous body.

In case the exciter actually becomes dry for any reason its activity may be restored by saturating it to the desired extent with water. It is adapted to be charged in the usual way and to be employed in the manner in which storage or secondary batteries are usually used. Its advantages consist in the decrease in the weight, which comes from the substitution of a lighter exciter for the liquid form, and also from doing away with the use of a liquid of a destructive character which tends to injure material with which it comes into contact and also because it may be used in positions in which a fluid battery cannot be used.

While I have described the use of a dry exciter composed of granules of cocoanut fiber and absorbed sulfuric acid, I do not wish to be understood as limiting the invention to granules of this character, as the granules of any material or substance which are not broken down or destroyed by sulfuric acid or similar strong exciting fluid and which will act to contain, hold, or absorb it may be used.

Having thus fully described my invention, I claim and desire to secure by Letters Patent of the United States—

A secondary or storage battery comprising a vessel or cell, an electrode contained in it, active material associated with the electrode, and an exciter contained in the vessel in exciting relation with the active material, consisting of grains of the husk or coating of cocoanut having a porous structure saturated and combined with sulfuric acid or other liquid exciter and indestructible thereby.

JAMES P. CLARE.

Witnesses:
F. F. RAYMOND, 2d,
J. M. DOLAN.